UNITED STATES PATENT OFFICE.

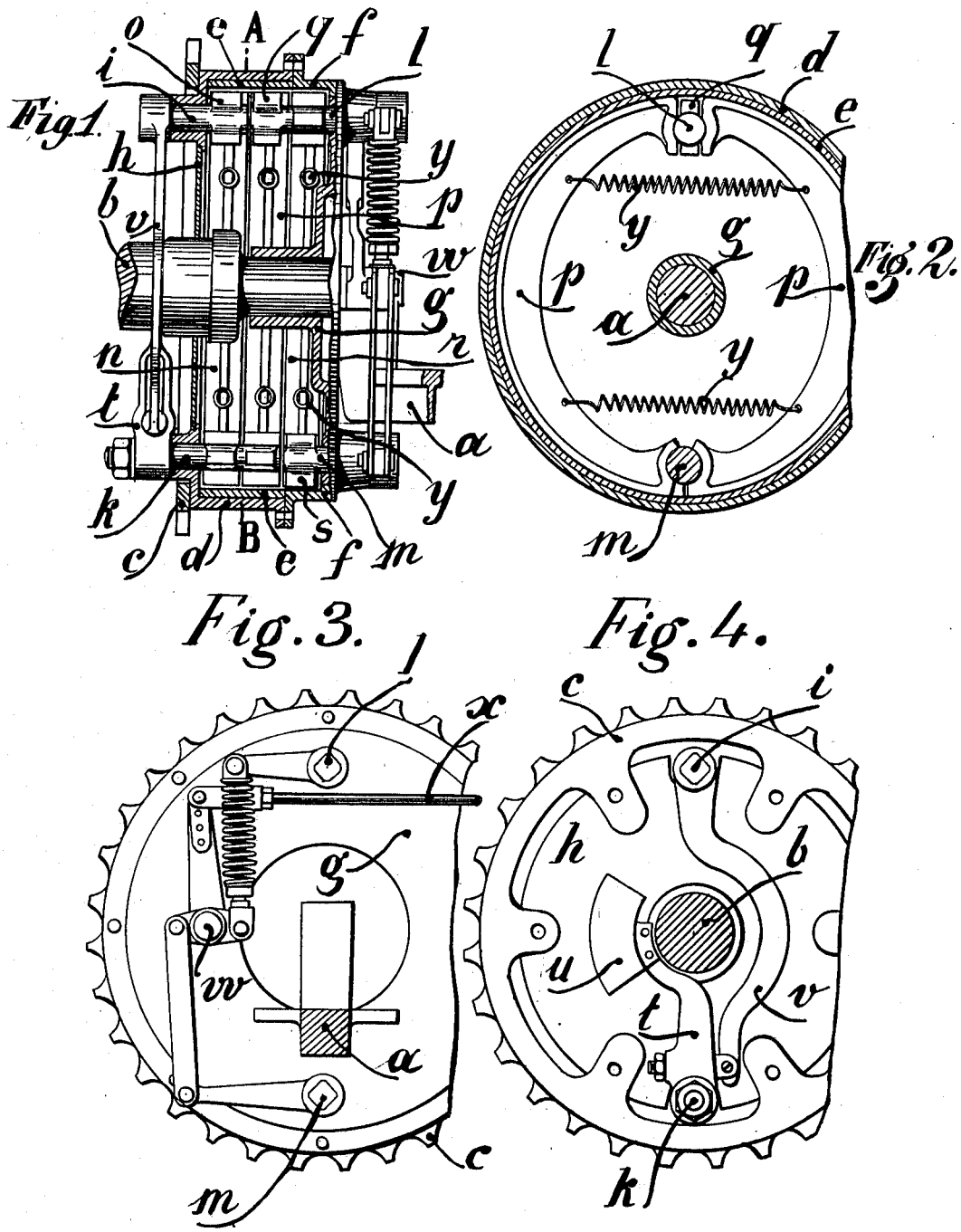

PAUL HALLOT, OF VERSAILLES, FRANCE.

BRAKE.

988,464.

Specification of Letters Patent.   Patented Apr. 4, 1911.

Application filed November 8, 1907. Serial No. 401,244.

*To all whom it may concern:*

Be it known that I, PAUL HALLOT, a citizen of France, residing at 2 Boulevard de Lesseps, Versailles, France, have invented certain new and useful Improvements in Brakes, of which the following is a specification.

The present invention relates to a special construction for wheel brakes for motorcars and more particularly to the type of brakes in which the centrifugal force of masses, revolving with the part to be braked is made use of.

In the accompanying drawings the improved brake is shown in Figure 1 in a longitudinal section. Fig. 2 represents a cross section on line A—B of Fig. 1. Figs. 3 and 4 are end views of the apparatus.

Referring to the drawings, $a$ is the axle and $b$ the spindle upon which the wheel rotates; $c$ is the pinion for driving the wheel of the car which has to be braked. A brake-box $d$ is fixed upon the side of said pinion $c$ which is turned away from the wheel, said brake-box revolving at the same speed as the wheel. A loose crown $e$ is located in the brake-box $d$. The brake-box $d$ is prolonged to facilitate its fitting up, by a flange $f$ of an inner diameter equal to that of the loose crown $e$. The brake-box is closed at its inner end by a disk $g$ and at its outer end by a disk $h$.

The brake-box $d$ carries two axles $i$ and $k$ which are parallel to spindle $b$ around which they revolve with the wheel. The disk $g$ carries two similar axles $l$ and $m$ which are fixed to the frame of the car. In the brake-box $d$, $f$, $g$, $h$ there are located three pairs of half brake collars, which are constructed as shown in Fig. 2. The first brake collar $n$ is pivoted to axle $k$ so that its halves can be moved outward by means of a cam $o$ fixed upon axle $i$. The second brake collar $p$ is pivoted upon the axle $m$ and it is controlled by a cam $q$ fixed upon axle $l$; the third brake collar $r$ is pivoted upon the axle $l$ and is adapted to be operated by a cam $s$ fixed upon the axle $m$. The two collars $n$ and $p$ are adapted to come in frictional contact with the loose crown $e$, while the third collar $r$ is designed to come into frictional contact with the flange $f$ of the brake-box.

A lever $t$ is fixed upon the axle $k$ outside the brake-box $d$, $f$, $g$, $h$ having a counterweight $u$ fixed to its free end. Said lever $t$ is, in any suitable manner, connected with a lever $v$ adapted to revolve the axle $i$. Upon the disk $g$ an axle $w$ is fixed outside the brake-box which can be revolved by means of a draw-rod $x$ which is connected with the foot-lever operated by the driver. The rotation of said axle $w$ is transmitted to the axles $l$ and $m$ by means of suitable connecting links which are simultaneously revolved if the conductor of the car presses upon the foot-lever for the brake.

The apparatus operates as follows:—If no action is exerted upon the cams $o$, $q$ and $s$ designed to operate the brake collars $n$, $p$, $r$, said brake-collars are, by means of the draw-spring $y$, pulled away from the parts to be brought in frictional contact. When the car is running, the centrifugal force acting upon the masses $u$ maintains the axle $i$ in such a position, that the corresponding cam $o$ brings the brake-collar $n$ in contact with the loose crown $e$ which revolves at the same speed as the wheel of the car. The two other brake-collars are out of frictional contact. To brake the car the conductor presses upon the foot-lever whereby the axles $l$ and $m$ are simultaneously rotated and the fixed brake-collars $p$ and $r$ pressed against the loose crown $e$ and the flange $f$ of the brake box respectively.

The flange $f$ of the brake-box is the organ for the constant braking action as it acts as long as the wheel revolves, the brake-box being rigid with the wheel. The brake-shoes $n$ however serve for producing the variable braking action which depends on the speed of the car; if the wheel revolves quickly, the loose crown $e$ will also revolve quickly and consequently the friction between said crown and the brake-shoes $n$ will be very energetic. This friction decreases with the speed of the car; if the car has reduced its speed to a certain limit, the counterweight $u$, being no longer influenced by the centrifugal force, remains in its normal position and as the cam $o$ no longer acts upon the brake-collars $n$, these will be withdrawn so that the loose crown $e$ stops. The variable braking action ceases and the wheel can again revolve. This revolution of the wheel will again operate the cam $o$ through the intermediary of the masses $u$ so that the variable braking action is applied again.

I claim:

A brake for motor cars comprising in combination a brake-box composed of two parts, of which the one revolves with the wheel, the other part being fixed to the frame of the car, a loose crown in said box, a coupling-collar for dragging said crown along with the wheel owing to the action of a centrifugal mass influencing said collar through the intermediary of a cam, two axles pivoted in the fixed part of the brake-box having cams which act upon two pairs of the brake-collars so that the one is pressed against the loose crown for obtaining the variable braking action depending on the speed of the car and the other against flange of the brake box for exerting a constant braking action, if the foot-lever for the brake be pressed down by the conductor of the car, substantially as described and for the purpose set forth.

In testimony whereof I have hereunto set my hand in presence of two subscribing witnesses.

PAUL HALLOT.

Witnesses:
H. C. COXE,
ALFRED FREY.